United States Patent
Takahashi et al.

(10) Patent No.: US 12,047,822 B2
(45) Date of Patent: Jul. 23, 2024

(54) BASE STATION, RADIO COMMUNICATION METHOD, AND RADIO COMMUNICATION SYSTEM FOR MR-DC

(71) Applicant: NTT DOCOMO, INC., Tokyo (JP)

(72) Inventors: Hideaki Takahashi, Tokyo (JP); Tianyang Min, Tokyo (JP); Masato Taniguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 353 days.

(21) Appl. No.: 17/431,649

(22) PCT Filed: Mar. 6, 2019

(86) PCT No.: PCT/JP2019/008965
§ 371 (c)(1),
(2) Date: Aug. 17, 2021

(87) PCT Pub. No.: WO2020/179035
PCT Pub. Date: Sep. 10, 2020

(65) Prior Publication Data
US 2022/0141728 A1    May 5, 2022

(51) Int. Cl.
*H04W 36/00* (2009.01)
*H04W 36/08* (2009.01)
*H04W 76/15* (2018.01)
*H04W 76/16* (2018.01)
*H04W 76/30* (2018.01)

(52) U.S. Cl.
CPC ....... *H04W 36/0069* (2018.08); *H04W 36/08* (2013.01); *H04W 76/16* (2018.02); *H04W 76/30* (2018.02)

(58) Field of Classification Search
CPC .... H04L 5/0035; H04W 36/08; H04W 76/10; H04W 76/15; H04W 76/16; H04W 76/30; H04W 76/32; H04W 76/34; H04W 76/36
See application file for complete search history.

(56) References Cited

U.S. PATENT DOCUMENTS 9,954,790 B2 *  4/2018  Hwang ................... H04L 47/32
10,111,162 B2 * 10/2018  Chen ..................... H04W 76/16
10,172,124 B2 *  1/2019  Dinan ............... H04W 72/0453
(Continued)

OTHER PUBLICATIONS

Office Action issued in corresponding Indian Patent Application No. 202117033254 mailed on Feb. 6, 2023 (8 pages).
(Continued)

*Primary Examiner* — Jenee Holland
(74) *Attorney, Agent, or Firm* — Osha Bergman Watanabe & Burton LLP

(57) ABSTRACT

A base station includes: a processor that sets a value in a second field when a CG-ConfigInfo message includes the second field other than a first field for a configuration of a terminal, the CG-ConfigInfo message being a request for configuring, modifying, or releasing a cell group of a secondary base station; and a transmitter that transmits the message to another base station. Upon addition and change of the cell group of the secondary base station, the CG-ConfigInfo message mandatorily includes ue-Capability-Info, and the ue-CapabilityInfo includes Multi Radio Access Technology dual connectivity (MRDC) capability and New Radio (NR) capability.

6 Claims, 11 Drawing Sheets

(56) References Cited

U.S. PATENT DOCUMENTS

| | | | | |
|---|---|---|---|---|
| 10,172,166 | B2* | 1/2019 | Xu | H04W 76/34 |
| 10,172,181 | B2* | 1/2019 | Kim | H04W 16/32 |
| 10,194,425 | B2* | 1/2019 | Van Der Velde | H04L 5/0053 |
| 10,219,317 | B2* | 2/2019 | Lee | H04W 72/21 |
| 10,225,779 | B2* | 3/2019 | Xu | H04W 36/30 |
| 11,956,660 | B2* | 4/2024 | Orsino | H04W 24/10 |
| 2014/0031040 | A1* | 1/2014 | Lee | H04W 48/14 |
| | | | | 455/437 |
| 2015/0201427 | A1* | 7/2015 | Lee | H04W 72/1215 |
| | | | | 455/450 |
| 2015/0208311 | A1* | 7/2015 | Lee | H04W 36/304 |
| | | | | 455/436 |
| 2015/0215990 | A1* | 7/2015 | Lee | H04W 88/06 |
| | | | | 455/434 |
| 2016/0044639 | A1* | 2/2016 | Yi | H04W 76/15 |
| | | | | 370/329 |
| 2016/0044744 | A1* | 2/2016 | Lee | H04W 76/34 |
| | | | | 370/329 |
| 2016/0105928 | A1* | 4/2016 | Xu | H04W 72/51 |
| | | | | 370/329 |
| 2016/0219604 | A1* | 7/2016 | Fujishiro | H04W 36/0061 |
| 2017/0195935 | A1* | 7/2017 | Xu | H04W 36/0064 |
| 2017/0215065 | A1* | 7/2017 | Vamanan | H04W 8/22 |
| 2017/0215225 | A1* | 7/2017 | Yi | H04W 12/10 |
| 2018/0049214 | A1* | 2/2018 | Kubota | H04W 72/1215 |
| 2018/0124612 | A1* | 5/2018 | Babaei | H04W 72/23 |
| 2018/0139639 | A1* | 5/2018 | Aiba | H04W 24/10 |
| 2018/0139665 | A1* | 5/2018 | Park | H04W 36/0007 |
| 2018/0160342 | A1* | 6/2018 | Park | H04W 36/0033 |
| 2018/0184475 | A1* | 6/2018 | Babaei | H04W 72/1215 |
| 2018/0199242 | A1* | 7/2018 | Deng | H04W 36/08 |
| 2018/0199315 | A1* | 7/2018 | Hong | H04L 5/00 |
| 2018/0255452 | A1* | 9/2018 | Wu | H04W 76/27 |
| 2018/0288826 | A1* | 10/2018 | Chiba | H04W 76/34 |
| 2018/0295670 | A1* | 10/2018 | Decarreau | H04W 76/38 |
| 2018/0332651 | A1* | 11/2018 | Hsieh | H04W 76/20 |
| 2018/0352468 | A1* | 12/2018 | Futaki | H04W 12/041 |
| 2018/0359800 | A1* | 12/2018 | Wu | H04W 76/27 |
| 2019/0028914 | A1* | 1/2019 | Wu | H04W 36/08 |
| 2019/0028940 | A1* | 1/2019 | Wu | H04W 36/38 |
| 2019/0029062 | A1* | 1/2019 | Wu | H04W 24/10 |
| 2019/0053292 | A1* | 2/2019 | Ali | H04W 88/06 |
| 2019/0068331 | A1* | 2/2019 | Lee | H04L 1/1861 |
| 2019/0253937 | A1* | 8/2019 | Hsieh | H04W 36/0061 |
| 2020/0128454 | A1* | 4/2020 | Teyeb | H04W 36/0088 |
| 2020/0169926 | A1* | 5/2020 | Hwang | H04W 80/08 |
| 2021/0211899 | A1* | 7/2021 | Koziol | H04W 24/10 |
| 2021/0243656 | A1* | 8/2021 | Paterson | H04W 36/0033 |
| 2021/0259038 | A1* | 8/2021 | Paterson | H04W 36/0033 |
| 2021/0337615 | A1* | 10/2021 | Rugeland | H04W 76/27 |
| 2022/0015173 | A1* | 1/2022 | Wu | H04W 76/19 |
| 2022/0141728 | A1* | 5/2022 | Takahashi | H04W 36/0069 |
| | | | | 370/331 |
| 2022/0150739 | A1* | 5/2022 | Da Silva | H04W 24/10 |
| 2022/0174593 | A1* | 6/2022 | Teyeb | H04W 24/08 |

OTHER PUBLICATIONS

Extended European Search Report issued in European Application No. 19918078.7 mailed on Aug. 11, 2022 (12 pages).

Huawei, HiSilicon, "Inter-node message for NGEN-DC and NE-DC", 3GPP TSG-RAN WG2#103bis, R2-1814699, Chengdu, China, Oct. 8-12, 2018 (7 pages).

Ericsson, "Review of RRC Containers in XnAP-TP 38.423", 3GPP TSG-RAN WG3 Meeting #99bis, R3-182163, Sanya, P.R. China, Apr. 16-20, 2018 (16 pages).

Catt, "Discussion on RRC version in DC", 3GPP TSG-RAN WG3 #102, R3-186561, Spokane, USA, Oct. 12-16, 2018 (44 pages).

Office Action issued in corresponding Chinese Patent Application No. 201980093448.3 mailed on May 31, 2023 (23 pages).

International Search Report issued in PCT/JP2019/008965, mailed on May 21, 2019 (3 pages).

Written Opinion of the International Searching Authority issued in PCT/JP2019/008965, mailed on May 21, 2019 (4 pages).

NTT Docomo, Inc., ZTE Corporation, Saneships; "Describing mandatory/optional information in inter-node RRC messages"; 3GPP TSG-RAN2 Meeting #105, R2-1902666; Athens, Greece, Feb. 25, 2019-Mar. 1, 2019 (2 pages).

3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).

3GPP TS 37.340 V15.4.0; "3rd Generation Partnership Project; Technical Specification Group Radio Access Network; Evolved Universal Terrestrial Radio Access (E-UTRA) and NR; Multi-connectivity; Stage 2 (Release 15)"; Dec. 2018 (67 pages).

Office Action issued in Japanese Application No. 2021-503353 mailed on Jun. 14, 2022 (5 pages).

* cited by examiner

FIG.4

HandoverPreparationInformation

This message is used to transfer the NR RRC information used by the target gNB during handover preparation, including UE capability information.
Direction: source gNB/source RAN to target gNB.

HandoverPreparationInformation message

```
HandoverPreparationInformation
HandoverPreparationInformation-IEs
  AS-Config
  RRCReconfiguration
  RRCReconfiguration-IEs
    RadioBearerConfig
      DRB-ToAddModList
        DRB-ToAddMod
          PDCP-Config
            discardTimer            ENUMERATED {ms10, ms20, ms30, ms40, ms50, ms60,
                                    ms75, ms100, ms150, ms200, ms250, ms300, ms500,
                                    ms750, ms1500, infinity}    OPTIONAL, -- Cond Setup
```

FIG.6

CG-ConfigInfo

—

This message is used by master eNB or gNB to request the SgNB to perform certain actions e.g. to establish, modify or release an SCG. The message may include additional information e.g. to assist the SgNB to set the SCG configuration. It can also be used by a CU to request a DU to perform certain actions, e.g. to establish, modify or release an MCG or SCG.

Direction: Master eNB or gNB to secondary gNB, alternatively CU to DU.

CG-ConfigInfo message

```
CG-ConfigInfo
CG-ConfigInfo-IEs
 MeasConfigMN
   measGapConfig    SetupRelease { GapConfig }
```

FIG.7

11.2.X    Mandatory information in inter-node RRC messages

The *AS-Config* transferred between source gNB and target gNB via the *HandoverPreparationInformation* shall include all fields necessary to describe the AS context configured for the UE. The conditional presence in section 6 is only applicable for gNB to UE communication. The "need" or "cond" statements are not applied in case of sending the fields from source gNB to target gNB. Some fields shall be included regardless of the "need" or "cond" e.g. *discardTimer*.

For a field in *CG-Config* and *CG-ConfigInfo* which conveys the parameters configured for a UE, the sender shall include all the fields, unless stated otherwise in the field description or in this sub-clause. Based on the full CG configuration obtained from the source node, the target node can build a delta CG configuration to be configured for the UE. For the fields in which the IE defined in section 6 is contained, the "need" or "cond" statements are not applied in *CG-Config* and *CG-ConfigInfo*. Nevertheless, the following fields are exceptional and delta signalling is supported:

- *measGapConfig*.

For the above fields, the absence of fields means that the sender maintains the values informed via the previous message.

NOTE:    When a new field is introduced in *CG-Config* or *CG-ConfigInfo*, and delta signalling is supported for the field, the field should be exclusively defined in those messages (i.e. do not reuse the IE defined for gNB to UE communication) by using the data type of *SetupRelease*.

FIG.8

11.2.X   Mandatory information in inter-node RRC messages

For the *AS-Config* transferred within the *HandoverPreparationInformation*:

- The source node shall include all fields necessary to reflect the (full) AS configuration of the UE;

- Need codes or conditions specified for subfields according to IEs defined in section 6 do not apply. I.e. some fields shall be included regardless of the "need" or "cond" e.g. discardTimer.

For a field that conveys the UE configuration transferred by source SN to MN within *CG-Config* and by MN to target SN in *CG-ConfigInfo(mcg-RB-Config, scg-RB-Config and sourceConfigSCG)*, when there is change of involved nodes :

- The source node shall include all fields necessary to reflect the (full) AS configuration of the UE, unless stated otherwise in the field description or in this sub-clause;

- Need codes or conditions specified for subfields according to IEs defined in section 6 do not apply;

- Based on the received (full) AS configuration, the target node can indicate the delta (difference) to the UE's AS configuration (as included in *CG-Config*).

Forthe other fields in *CG-Config* and *CG-ConfigInfo*, full configuration appliesand the receiver does not maintain the values informed via a previous message, except for the following field (for which delta signaling applies):

- *measGapConfig*.

For the above field, the absence of field means that the receiver maintains the values informed via the previous message.

FIG.9

```
CG-ConfigInfo-IEs ::=        SEQUENCE {
    ue-CapabilityInfo            OCTET STRING (CONTAINING UE-CapabilityRAT-
ContainerList)               OPTIONAL, -- Cond SN-Addition
    candidateCellInfoListMN      MeasResultList2NR
OPTIONAL,
    candidateCellInfoListSN      OCTET STRING (CONTAINING MeasResultList2NR)
OPTIONAL,
    measResultCellListSFTD       MeasResultCellListSFTD
OPTIONAL,
    ...
}
```

CG-ConfigInfo field descriptions ue-CapabilityInfo
Contains the IE *UE-CapabilityRAT-ContainerList* supported by the UE. This list shall include *UE-MRDC-Capability* and the UE capability of RAT served by SN (*UE-EUTRA-Capability* or *UE-NR-Capability*).

| Conditional Presence | Explanation |
|---|---|
| SN-Addition | The field is mandatory present upon SN addition and change. Otherwise, the field is absent. |
| SN-AddMod | The field is mandatory present upon SN addition and optionally present upon SN modification. Otherwise, the field is absent. |

BASE STATION, RADIO COMMUNICATION METHOD, AND RADIO COMMUNICATION SYSTEM FOR MR-DC

TECHNICAL FIELD

The present invention relates to a network node in a radio communication system.

BACKGROUND ART

For New Radio (NR) (which is also referred to as "5G") that is a successor system to Long Term Evolution (LTE), technology has been studied that meets requirements, such as those of large capacity system, a high data transmission rate, low latency, simultaneous connection of multiple terminals, low cost, and power saving (e.g., Non-Patent Document 1).

In an NR system, similar to dual connectivity in an LTE system, a technique called LTE-NR dual connectivity, NR-NR dual connectivity, or Multi Radio Access Technology (Multi-RAT) dual connectivity (which is referred to as "MR-DC," hereinafter) has been introduced such that data is divided between a base station of an LTE system (eNB) and a base station of an NR system (gNB) and data is simultaneously transmitted and received by these base stations (e.g., Non Patent Document 2).

RELATED ART DOCUMENT

Non-Patent Document

Non-Patent Document 1: 3GPP TS 38.300 V 15.4.0 (2018-12)

Non-Patent Document 2: 3GPP TS 37.340 V 15.4.0 (2018-12)

SUMMARY OF THE INVENTION

Problem to be Solved by the Invention

In an NR radio communication system, a case exists in which an inter-node RRC message between base station apparatuses related to an RRC message is mandatory, even if the RRC message between the user apparatus and the base station apparatus is optional.

The present invention has been accomplished in view of the above-described point, and an object is to transmit and receive information that is mandatory between network nodes in a radio communication system.

Means for Solving the Problem

According to the disclosed technology, there is provided a network node including a control unit that sets an information element in a field included in an inter-network node message for configuring communication with a user apparatus when the field is mandatory in the inter network node message; and a transmitting unit that transmits, to another network node, the inter-network node message including the field in which the information element is set, wherein, when a predetermined condition is satisfied, the field is mandatory in the inter-network node message.

Advantage of the Invention

According to the disclosed technology, information that is mandatory between network nodes in a radio communication system can be transmitted and received.

BRIEF DESCRIPTION OF DRAWINGS

FIG. 4 is a diagram illustrating an information element used in the first operation example according to the embodiment of the present invention.

FIG. 6 is a diagram illustrating an information element used in the second operation example according to the embodiment of the present invention.

FIG. 7 is an example of a modification of a specification for the first and second operation examples according to an embodiment of the present invention.

FIG. 8 is an example of a modification of a specification for a third operation example according to an embodiment of the present invention.

FIG. 9 is a diagram illustrating an information element used in the third operation example according to the embodiment of the present invention.

EMBODIMENTS OF THE INVENTION

In the following, embodiments of the present invention are described with reference to the drawings. The embodiments described below are merely examples, and embodiments to which the present invention is applied are not limited to the embodiments described below.

In operating a radio communication system according to an embodiment of the present invention, existing technology is used as appropriate. Here, the existing technology is, for example, the existing LTE. However, the existing technology is not limited to the existing LTE. The term "LTE" as used in this specification has a broad meaning including LTE-Advanced and a scheme subsequent to LTE-Advanced (e.g., NR), unless as otherwise specified.

In the embodiments of the present invention described below, terms used in the existing LTE are used, such as SS (Synchronization signal), PSS (Primary SS), SSS (Secondary SS), PBCH (Physical broadcast channel), and PRACH (Physical random access channel). This is for convenience of description, and signals, functions, and the like similar to these may be referred to by other names. The above-described terms in NR correspond to NR-SS, NR-PSS, NR-SSS, NR-PBCH, NR-PRACH, and so forth. However, even if a signal is used for NR, the signal is not always specified as "NR-."

In the embodiments of the present invention, a duplex method may be a Time Division Duplex (TDD) method, a Frequency Division Duplex (FDD) method, or any other method (e.g., Flexible Duplex).

In the embodiments of the present invention, "configuring" a radio parameter, or the like, may be "pre-configuring" a predetermined value, or configuring a radio parameter transmitted from a base station apparatus 10 or a user apparatus 20.

Figure 1:
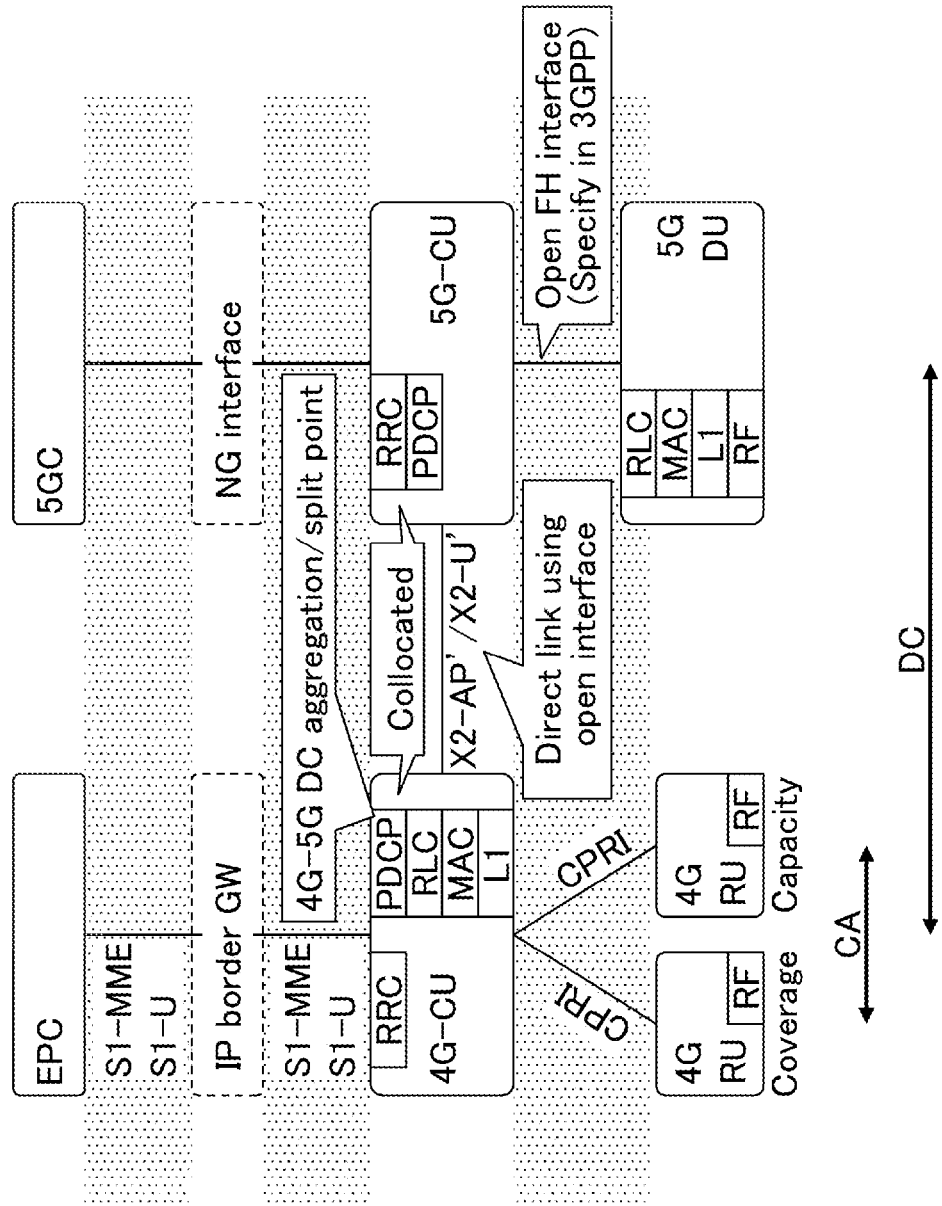
FIG. 1 is a diagram illustrating an example of a configuration of a network architecture according to an embodiment of the present invention.

FIG. 1 is a diagram illustrating an example of a configuration of a network architecture in the embodiments of the present invention. As illustrated in FIG. 1, a radio network architecture according to an embodiment of the present invention includes 4G-CU, 4G-RU (Remote Unit, remote radio station), an Evolved Packet Core (EPC), and the like, on an LTE-Advanced side. The radio network architecture according to the embodiment of the present invention includes 5G-CU, 5G-DU, and the like, on a 5G side.

As illustrated in FIG. 1, 4G-CU includes layers up to the Radio Resource Control (RRC), Packet Data Convergence Protocol (PDCP), Radio Link Control (RLC), Medium Access Control (MAC), and L1 (Layer 1, PHY layer or physical layer) and is connected to 4G-RU via Common Public Radio Interface (CPRI). A network node including 4G-CU and 4G-RU is referred to as eNB.

On the 5G side, as illustrated in FIG. 1, 5G-CU includes an RRC layer; is connected to 5G-DU via a Fronthaul (FH) interface; and is connected to 5G Core Network (5GC) via an NG interface. 5G-CU is also connected to 4G-CU via an X2 interface. The PDCP layer in 4G-CU is a coupling point or a separation point for performing 4G-5G Dual Connectivity (DC), i.e., E-UTRA-NR Dual Connectivity (EN-DC). A network node including 5G-CU and 5G-DU is referred to as gNB. 5G-CU may also be referred to as gNB-CU, and the 5G-DU may be referred to as gNB-DU.

As illustrated in FIG. 1, a Carrier Aggregation (CA) is performed between 4G and RU, and DC is performed between 4G-RU and 5G-DU. Note that, though it is not depicted, a User Equipment (UE) is wirelessly connected via 4G-RU RF or 5G-DU RF to transmit and receive packets.

Note that FIG. 1 illustrates a radio network architecture for LTE-NR DC, i.e., EN-DC (E-UTRA-NR Dual Connectivity (EN-DC). However, a similar radio network architecture may be used when 4G-CU is separated into CU-DU or when NR standalone operation is performed. When the 4G-CU is separated into CU-DU, functions related to the RRC layer and the PDCP layer may be moved to 4G-CU and the RLC layer or lower may be included in 4G-DU. Here, a CPRI data rate may be reduced by CU-DU separation.

A plurality of 5G-DUs may be connected to 5G-CU. Furthermore, NR-NR Dual Connectivity (NR-DC) may be performed by connecting a UE to a plurality of 5G-CUs, or NR-DC may be performed by connecting a UE to a plurality of 5G-DUs and a single 5G-CU.

Figure 2:
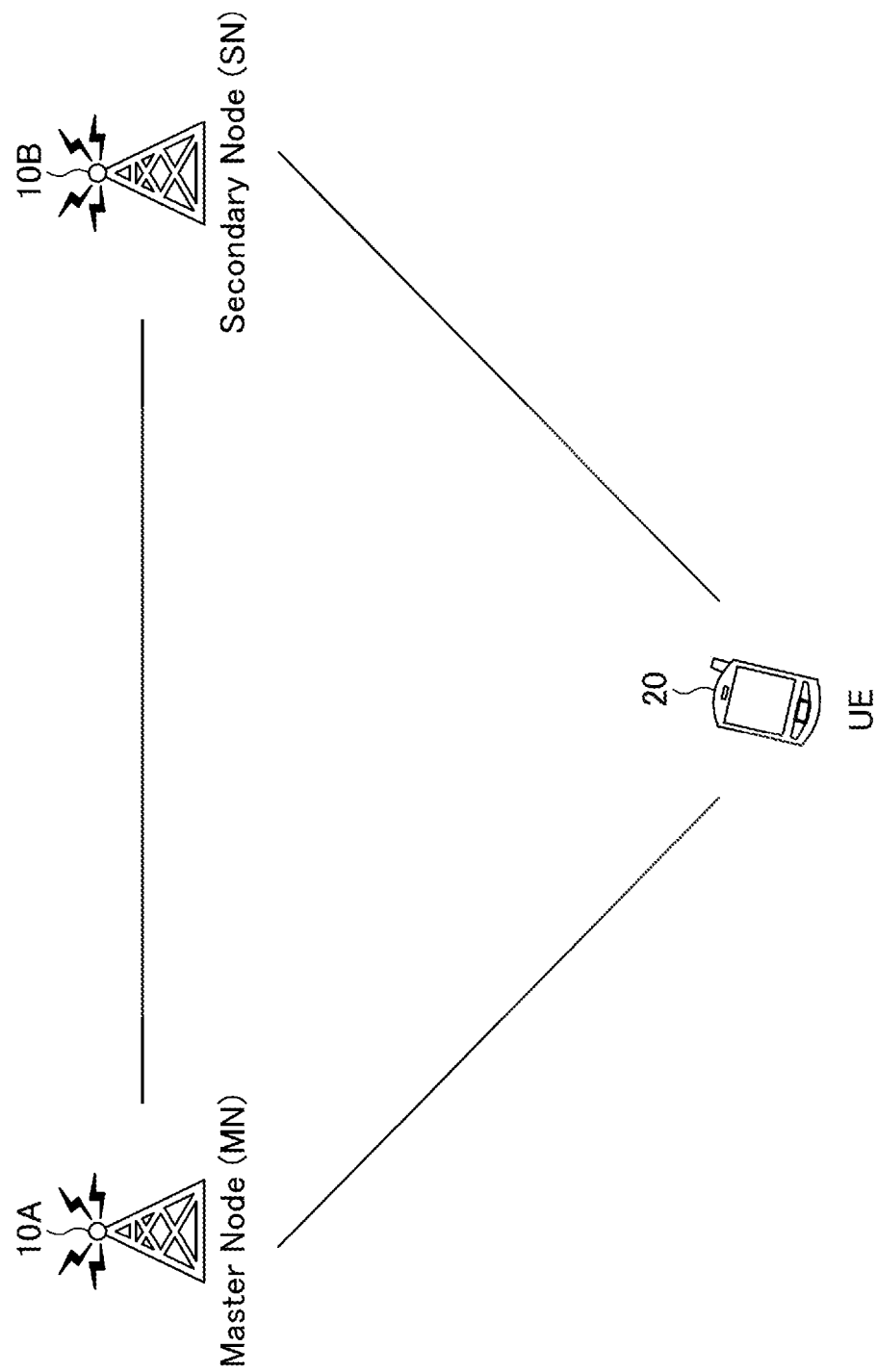
FIG. 2 is a diagram illustrating an example of a configuration of a radio communication system according to an embodiment of the present invention.

FIG. 2 is a diagram illustrating an example of a configuration of a radio communication system according to an embodiment of the present invention. FIG. 2 is a schematic diagram illustrating a radio communication system for Multi-RAT Dual Connectivity (MR-DC).

As illustrated in FIG. 2, a user apparatus 20 communicates with a base station apparatus 10A provided by an NR system and a base station apparatus 10B provided by the NR system (hereinafter, referred to as "base station apparatuses 10" for a case where the base station apparatus 10A and the base station apparatus 10B are not distinguished). In addition, the user apparatus 20 supports NR-NR dual connectivity, that is, NR-DC, where the base station apparatus 10A is used as a master node (hereinafter referred to as "MN") and the base station apparatus 10B is used as a secondary node (hereinafter referred to as "SN"). The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

As illustrated in FIG. 2, the user apparatus 20 communicates with the base station apparatus 10A provided by an LTE system and the base station apparatus 10B provided according to an NR system. In addition, the user apparatus 20 supports LTE-NR dual connectivity, that is, EN-DC, where the base station apparatus 10A is used as an MN and the base station apparatus 10B is used as an SN. The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

Although the following embodiment is described assuming NR-NR dual connectivity, the user apparatus 20 according to the embodiment of the present invention is not limited to the NR-NR dual connectivity, and is applicable to dual connectivity among a plurality of radio communication systems using different RATs, that is, MR-DC.

Figure 3:
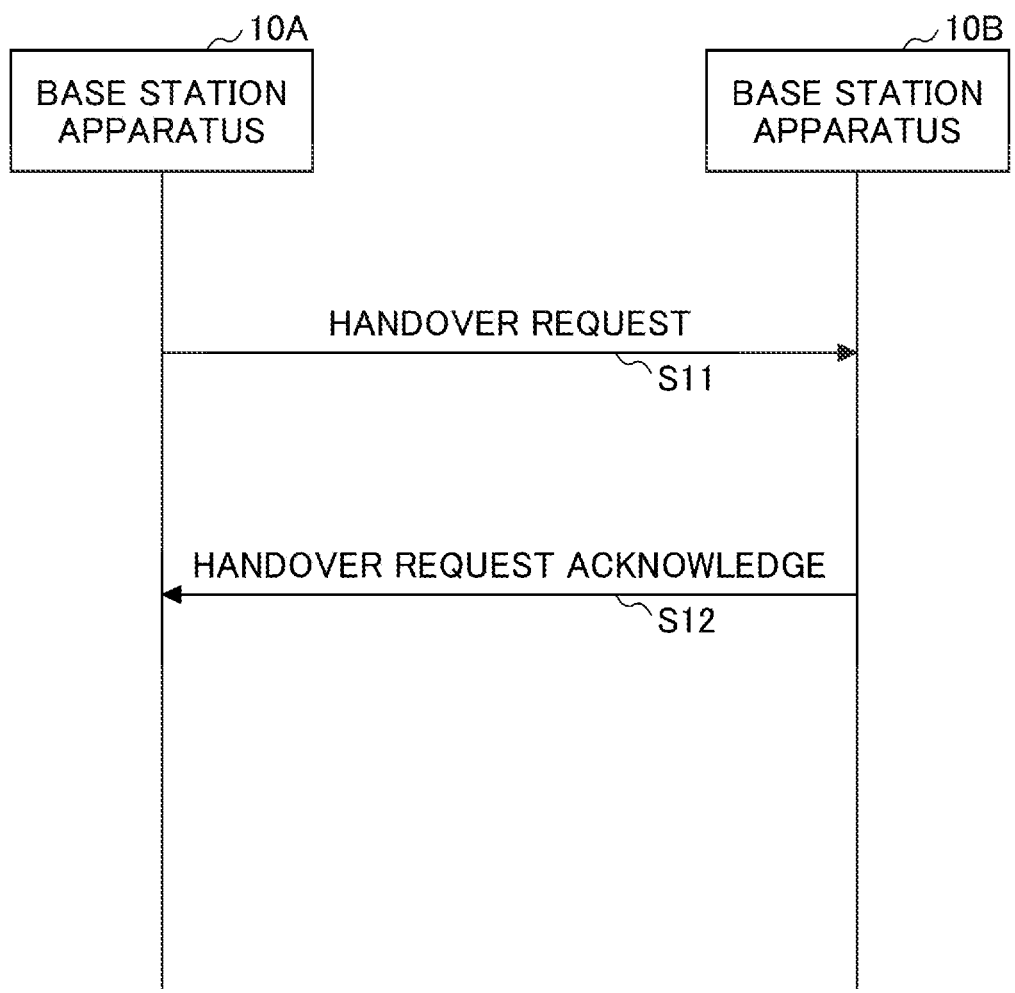
FIG. 3 is a sequence diagram for illustrating a first operation example according to an embodiment of the present invention.

FIG. 3 is a sequence diagram for illustrating a first operation example in an embodiment of the present invention. The base station apparatus 10A illustrated in FIG. 3 is an NG-RAN node that is a handover source, and the base station apparatus 10B is an NG-RAN node that is ha handover target. The user apparatus 20 starts a handover from the base station apparatus 10A to the base station apparatus 10B.

At step S11, the base station apparatus 10A transmits "HANDOVER REQUEST" to the base station apparatus 10B. The "HANDOVER REQUEST" includes "HandoverPreparationInformation" that is an inter-node RRC message. The Access Stratum-Config (AS-Config) that is a configuration at a radio access layer is transferred from the base station apparatus 10A to the base station apparatus 10B through the "HandoverPreparationInformation." The AS-Config is provided with all the fields required for describing AS context for a configured function. Accordingly, it is possible that "need" or "cond" to be applied to a field of an RRC message between the user apparatus 20 and the base station apparatus 10 does not get applied to a field of an RRC message between the base station apparatuses 10. For interpretation of a field, "need" implies, for example, identify, maintain, no action, or release, and "coed" implies a condition on a configuration or a condition on a message. Some fields of an RRC message between the base station apparatuses 10 are mandatorily included, regardless of "need" or "cond." For example, the information element "discardTimer" is a field that is mandatorily included. At step S12, the base station apparatus 10B that is the target NG-RAN node transmits "HANDOVER REQUEST ACKNOWLEDGE" to the base station apparatus 10A that is the source NG-RAN node, and thereby a handover process is initiated.

FIG. 4 is a diagram illustrating an information element used in the first operation example in the embodiment of the present invention. FIG. 4 is an example of an inter-node RRC message, "HandoverPreparationInformation." The "HandoverPreparationInformation" is transmitted from the source NG-RAN node or another RAN to the target NG-RAN node.

As illustrated in FIG. 4, the "HandoverPreparationInformation" includes the information element "HandoverPreparationInformation-IEs." The "HandoverPreparationInformation-IEs" includes the information element "AS-Config." The "AS-Config" includes the information element "RRCReconfiguration." The "RRCReconfiguration" includes the information element "RRCReconfiguration-IEs." The "RRCReconfiguration-IEs" includes the information element "RadioBearerConfig." The "RadioBearerConfig" includes the information element "DRB-ToAddModList." The "DRB-ToAddModList" includes the information element "DRB-ToAddMod." The "DRB-ToAddMod" includes the information element "PDCPConfig." The "PDCPConfig" includes the information element. "discardTimer."

As illustrated in FIG. 4, the "discardTimer" is an information element in which a timer value is set. The "discardTimer" is started upon obtaining a PDCP Service Data Unit (SDU) from a higher layer at a PDCP layer, and the PDCP SDU is discarded upon expiration of the "discardTimer."

As illustrated in FIG. 4, the "discardTimer" is optional between the user apparatus 20 and the base station apparatus 10 with a condition of "setup," such as "OPTIONAL, —Cond Setup." However, the "discardTimer" may be transmitted as a mandatory field in an inter-node RRC message from the source NG-RAN node to the target NG-RAN node through the "HandoverPreparationInformation." Namely, the network can be caused to function appropriately by transmitting information that is mandatory between network nodes as a mandatory field, regardless of the setting of the corresponding field between the user apparatus 20 and the base station apparatus 10.

Figure 5:
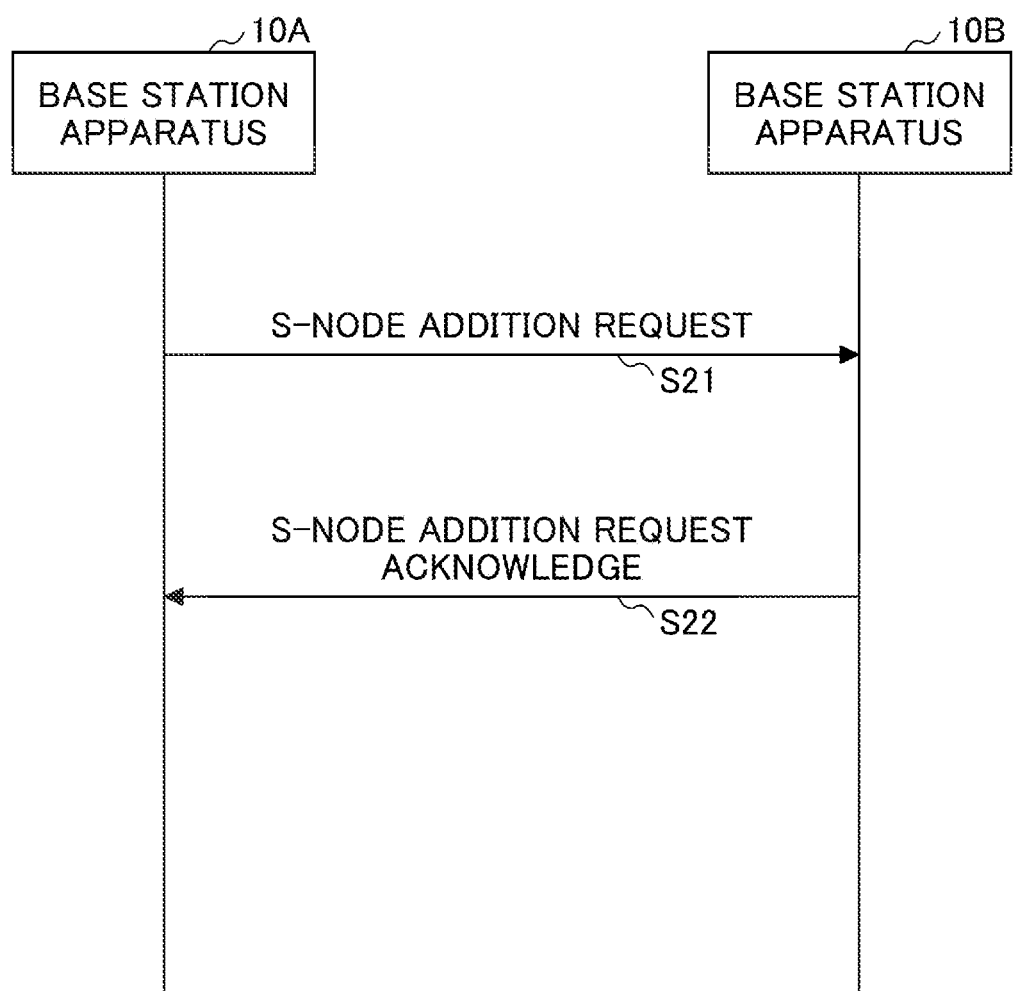
FIG. 5 is a sequence diagram illustrating a second operation example according to an embodiment of the present invention.

FIG. 5 is a sequence diagram illustrating a second operation example in an embodiment of the present invention. The base station apparatus 10A illustrated in FIG. 5 is an NG-RAN master node, and the base station apparatus 10B is an NG-RAN secondary node.

At step S21, the base station apparatus 10A transmits "S-NODE ADDITION REQUEST" to the base station apparatus B. The "S-NODE ADDITION REQUEST" includes an inter-node RRC message, "CG-ConfigInfo." A request for executing connection establishment, modification, or release in a secondary cell group is transferred from the base station apparatus 10A to the base station apparatus 10B through "CG-ConfigInfo." At step S22, the base station apparatus 10B that is the NG-RAN secondary node transmits "S-NODE ADDITION REQUEST ACKNOWLEDGE" to the base station apparatus 10A that is the NG-RAN master node, and thereby a resource for DC is assigned to the user apparatus 20.

Note that, for example, the "S-NODE ADDITION REQUEST" may be replaced with "S-NODE MODIFICATION REQUEST" or "S-NODE RELEASE REQUEST." The "S-NODE MODIFICATION REQUEST" is a message for requesting modification at the NG-RAN secondary node, and the "S-NODE RELEASE REQUEST" is a message for requesting release at the NG-RAN secondary node.

FIG. 6 is a diagram for illustrating an information element used in the second operation example in the embodiment of the present invention. FIG. 6 is an example of an inter-node RRC message, "CG-ConfigInfo." The "CG-ConfigInfo" is transmitted from the NG-RAN master node or the LTE-RAN master node to the NG-RAN secondary node. The "CG-ConfigInfo" is an information element for executing connection establishment, modification, or release in a secondary cell group.

As illustrated in FIG. 6, the "CG-ConfigInfo" includes an information element "CG-ConfigInfo-IEs." The "CG-ConfigInfo-IEs" includes an information element "MeasConfigMN." In the "MeasConfigMN," "GapConfig" is set in the information element "measGapConfig" by using a data type "SetupRelease." The data type "SetupRelease" is a data type such that NULL is set during Release, and the corresponding information element is set during Setup. Namely, in the "measGapConfig", the "GapConfig" is set during Setup.

Here, when the data type "SetupRelease" is used in the information element "CG-Config" for configuring a radio configuration for the secondary cell group and in the above-described "CG-ConfigInfo," a delta configuration is to be supported. When the data type "SetupRelease" is not used in the "CG-Config" and the "CG-ConfigInfo," the transmitting side is to include all the fields related to functions configured for the user apparatus in the configuration. Namely, not including a field in a configuration implies that the function corresponding to the field is not to be configured for the user apparatus 20, unless the "SetupRelease" is used.

As described above, the delta configuration is supported when the data type is SetupRelease. As for various types of configurations configured for the user apparatus 20 during communication, information configured for the user apparatus 20, such as a radio bearer configuration or a secondary cell configuration, may be changed, for example, due to a communication condition. The network can cause the user apparatus 20 to maintain stable communication by changing, each time, the configuration to an appropriate configuration. Here, the configuration represents information for communicating a setting applied to the user apparatus 20.

In a delta configuration, when a setting value is to be modified in the user apparatus 20 or the network node, only a notification of a difference from a value that is previously set is to be transmitted. From the perspective of radio resource consumption or power consumption in a terminal, it is desirable to apply the delta configuration, if the delta configuration is available. Various types of configurations that have already been configured for the user apparatus 20 can be transferred between network nodes. For example, during crossing between network nodes for mobility, the delta configuration can be maintained.

A full configuration has been known such that, when a setting value is to be modified, a notification of all the setting values are to be transmitted. For example, when network nodes are incompatible, a full configuration can be applied. For a full configuration, all the fields included in an inter-network node message are mandatory.

FIG. 7 is an example of a modification of a specification for the first and second operation examples according to an embodiment of the present invention. As illustrated in FIG. 7, the AS-Config that is a configuration at the radio access layer is transferred from the source gNB to the target gNB through. "HandoverPreparationInformation." The AS-Config is provided with all the fields required for describing AS context related to a configured function. Accordingly, it is possible that "need" or "cond" applied to a field of an RRC message between the user apparatus 20 and the base station apparatus 10 does not get applied to a field in an RRC message between the base station apparatuses 10. For interpretation of a field, "need" implies, for example, identify, maintain, no action, or release, and "cond" implies a condition on a configuration or a condition on a message. Some fields of an RRC message between the base station apparatuses 10 are mandatorily included, regardless of "need" or "cond." For example, the information element "discardTimer" is a field that is mandatorily included.

Namely, the network can be caused to function appropriately by transmitting information that is mandatory between network nodes as a mandatory field, regardless of the setting of the corresponding field between the user apparatus 20 and the base station apparatus 10.

As illustrated in FIG. 7, the "CG-Config" and the "CG-ConfigInfo" used for transmitting setting parameters for the user apparatus 20 may include all the fields when the delta configuration is not to be applied. Based on the full CG configuration obtained from the source gNB, the target gNB can create a delta CG configuration. The "need" or "cond" applied to a field need not be applied to the "CG-Config" and the "CG-ConfigInfo."

Here, for an information element "measGapConfig," delta signalling may be supported. Not including the "measGapConfig" field in an inter-node RRC message may imply that a value reported in the previous message is maintained. When a field that is newly introduced to the "CG-Config" or the "CG-ConfigInfo" supports delta signalling, the field may be defined by mandatorily using the data type "SetupRelease" in a message including the "CG-Config" or the "CG-ConfigInfo."

Furthermore, when the data type "SetupRelease" is used in the "CG-Config" and the "CG-ConfigInfo," the delta configuration may be supported. When the data type "SetupRelease" is not used in the "CG-Config" and the "CG-ConfigInfo," the transmitting side may include all the fields related to the functions configured for the user apparatus in the configuration. Namely, not including a field in a configuration may imply that the function corresponding to the field is not configured for the user apparatus 20, unless the "SetupRelease" is used.

Namely, when the data type "SetupRelease" is not used, the network can be caused to function appropriately by transmitting a configuration while including, in the configuration, all the fields related to the functions configured for the user apparatus 20 as mandatory fields.

FIG. 8 is a modified example of a specification for a third operation example in an embodiment of the present invention. The third operation example is executed according to the sequence diagram illustrated in FIG. 3 or FIG. 5. As illustrated in FIG. 8, the AS-Config that is a configuration at the radio access layer is transferred from the source gNB to the target gNB through "HandoverPreparationInformation." The AS-Config is provided with all the fields required for describing AS context for a configured function. Accordingly, it is possible that "need" or "cond" applied to a field in an RRC message between the user apparatus 20 and the base station apparatus 10 does not get applied to a field in an RRC message between the base station apparatuses 10. For interpretation of a field, "need" implies, for example, identify, maintain, no action, or release, and "cond" implies a condition on a configuration or a condition on a message. Some fields of an RRC message between the base station apparatuses 10 are mandatorily included, regardless of "need" or "cond." For example, the information element "discardTimer" is a field that is mandatorily included.

Furthermore, as illustrated in FIG. 8, when the delta configuration does not get applied, the "CG-Config" used for transmitting setting parameters for the user apparatus 20 from the source SN to MN and the CG-ConfigInfo" from the MN to the target SN may include all the fields. The CG-ConfigInfo" may include an information element "mcg-RB-Config," an information element "scg-RB-Config," and an information element "sourceConfigSCG." The "mcg-RB-Config" is the information element including a radio bearer configuration at the MN. The "scg-RB-Config" is the information element including a radio bearer configuration at the SN. The "sourceConfigSCG" is the information element including the current individual SCG configurations. The "mcg-RB-Config," the "scg-RB-Config," and the "sourceConfigSCG" represent configurations to which the delta configurations can be applied.

The source SN node may include all the required fields for reflecting the AS configuration of the UE 20, except for a case in which the delta configuration is specified. The "need" or "cond" set in a sub-field need not be applied to the "CG-Config" and the "CG-ConfigInfo." The target node may apply the delta configuration for the AS configuration of the UE 20, based on the received full configuration.

The full configuration may be applied to the fields other than the fields related to the UE configuration included in the CG-Config" and the "CG-ConfigInfo," and the node on the receiving side need not maintain the value reported by the previous message. However, the information element "measGapConfig" to which the delta signalling is applied is an exception. When the field is empty, the node on the receiving side maintains the value reported by the previous message.

FIG. 9 is a diagram illustrating an information element used in the third operation example according to the embodiment of the present invention. As illustrated in FIG. 9, the information element "CG-ConfigInfo-IEs" may include "ue-CapabilityInfo" with a condition "SN-Addition." The "ue-CapabilityInfo" includes the information element "UE-CapabilityRAT-ContainerList" supported by the UE 20. The "UE-CapabilityRAT-ContainerList" includes "UE-MRDC-Capability" that is the capability supported by the UE 20 and "UE-EUTRA-Capability" or "UE-NR-Capability" that is the capability of the UE to support the RAT provided by the SN. The condition "SN-Addition" represents that the field is mandatorily present for SN addition or modification and that the field is empty for other cases.

According to the above-described embodiments, the network can be caused to appropriately function by transmitting the information that is mandatory between the network nodes as a mandatory field of an inter-network node message, regardless of the setting of the corresponding field between the user apparatus 20 and the base station apparatus 10. Furthermore, when the data type "SetupRelease" is not used, the base station apparatus 10 can cause the network to appropriately function by transmitting an inter-network node message while including, in the configuration, all the fields related to the functions or for the user apparatus 20 as mandatory fields.

Namely, mandatory information between network nodes in a radio communication system can be transmitted and received.

(Apparatus Configuration)

Next, an example of functional configurations of the base station apparatus 10 and the user apparatus 20 for performing the processes and operations described above is described. The base station apparatus 10 and user apparatus 20 include functions for implementing the embodiments described above. However, each of the base station apparatus 10 and the user apparatus 20 may include only a part of the functions in the embodiments.

<Base Station Apparatus 10>

Figure 10:
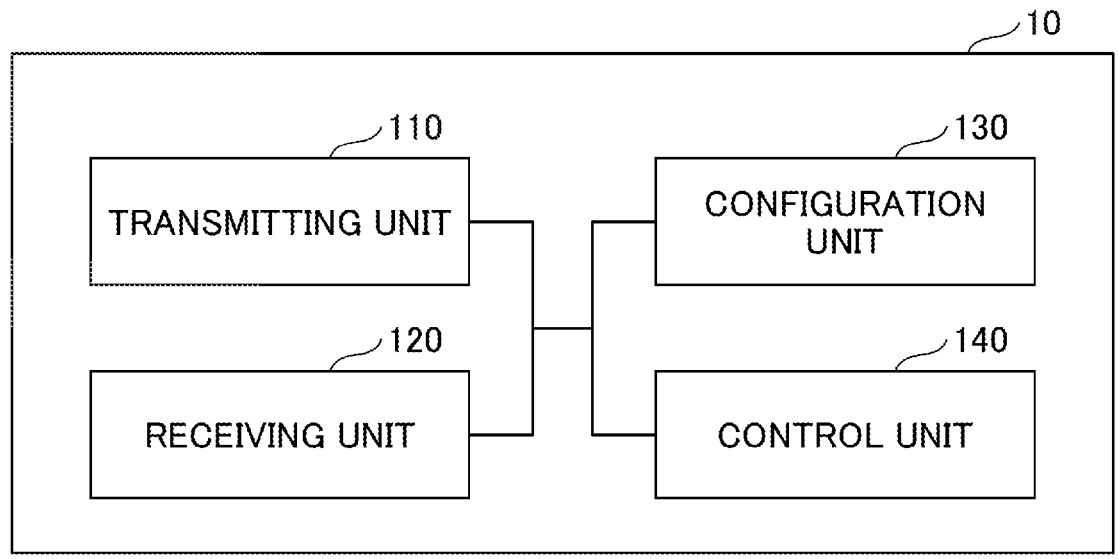
FIG. 10 is a diagram illustrating an example of a functional configuration of a base station apparatus 10 according to an embodiment of the present invention.

FIG. 10 is a diagram illustrating an example of a functional configuration of the base station apparatus 10 according to an embodiment of the present invention. As illustrated in FIG. 10, the base station apparatus 10 includes a transmitting unit 110; a receiving unit 120; a configuration unit 130; and a control unit 140. The functional configuration shown in FIG. 10 is only one example. If the operation according to the embodiments of the present invention can be executed, the functional division and the name of the functional units may be any division and names.

The transmitting unit 110 includes a function for generating a signal to be transmitted to the user apparatus 20 and transmitting the signal through radio. The transmitting unit 110 transmits an inter-network node message to another network node. The receiving unit 120 includes a function for receiving various signals transmitted from the user apparatus 20 and retrieving, for example, information of a higher layer from the received signals. The transmitting unit 110 has a function to transmit NR-PSS, NR-SSS, NR-PBCH, DL/UL control signals, or the like, to the user apparatus 20. The receiving unit 120 receives an inter-network node message from another network nodes.

The configuration unit 130 stores preconfigured configuration information and various configuration information to be transmitted to the user apparatus 20 in a storage device and reads out the information if necessary. The content of the configuration information is, for example, configuration information related to communication by the user apparatus 20, such as a configuration of a radio bearer or a configuration of a secondary cell.

As described in the embodiments, the control unit 140 controls communication with the user apparatus 20 to which NR-DC is applied. Furthermore, the control unit 140 obtains a configuration for communication with the user apparatus 20 from another network node, or transmits a notification of a configuration for communication with the user apparatus 20 to another network node. Furthermore, the control unit 140 applies a delta configuration or a full configuration to a configuration for communication with the user apparatus 20. A functional unit related to signal transmission in the control unit 140 may be included in the transmitting unit 110, and a functional unit related to signal reception in the control unit 140 may be included in the receiving unit 120.

<User Apparatus 20>

Figure 11:
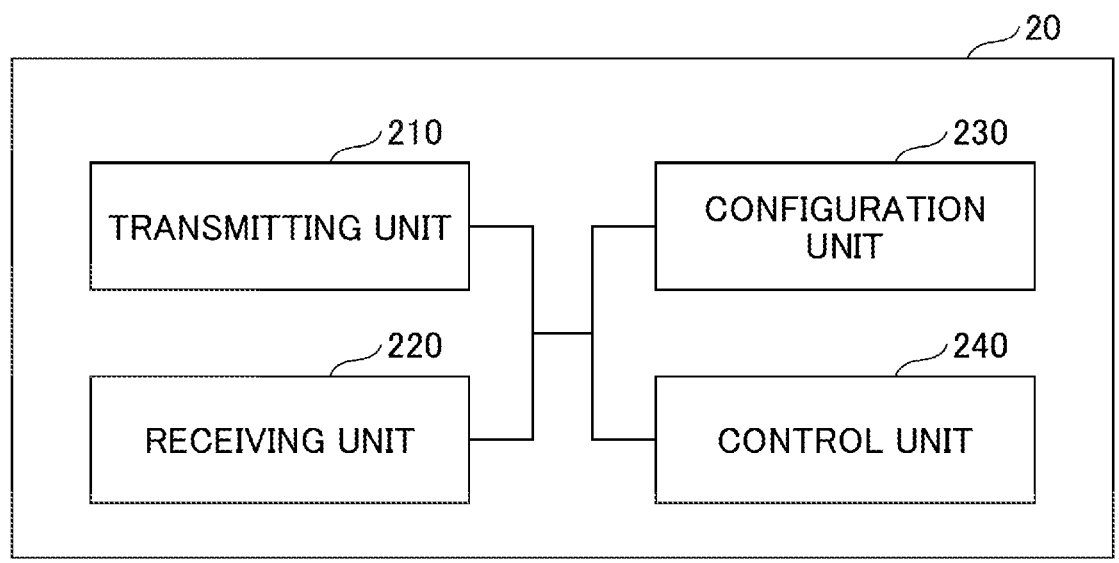
FIG. 11 is a diagram illustrating an example of a functional configuration of a user apparatus 20 according to an embodiment of the present invention.

FIG. 11 is a diagram illustrating an example of a functional configuration of a user apparatus 20 according to an embodiment of the present invention. As illustrated in FIG. 11, the user apparatus 20 includes a transmitting unit 210; a receiving unit 220; a configuration unit 230; and a control unit 240. The functional configuration shown in FIG. 11 is only one example. If the operation according to the embodiments of the present invention can be performed, the functional division and the name of the functional units may be any division and names.

The transmitting unit 210 creates a transmission signal from transmission data and transmits the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, or the like, transmitted from the base station apparatus 10. For example, the transmitting unit 210 transmits PSCCH (Physical Sidelink Control Channel), PSSCH (Physical. Sidelink Shared Channel), PSDCH (Physical Sidelink Discovery Channel), PSBCH (Physical Sidelink Broadcast Channel), or the like, to another user apparatus 20 as D2D communication, and the receiving unit 120 receives PSCCH, PSSCH, PSDCH, PSBCH, or the like, from another user apparatus 20.

The configuration unit 230 stores various types of configuration information received from the base station apparatus 10 or the user apparatus 20 by the receiving unit 220, and reads out the information if necessary. The configuration unit 230 also stores preconfigured configuration information. The content of the configuration information is, for example, configuration information related to communication by the user apparatus 20, such as a configuration of a radio bearer or a configuration of a secondary cell.

As described in the embodiments, the control unit 240 performs radio communication to which NR-DC is applied. Furthermore, the control unit 240 receives information related to radio communication from the base station apparatus 10, the control unit 240 controls radio communication by the user apparatus 20 based on the information, and the control unit 240 reports necessary information to the base station apparatus 10. A functional unit related to signal transmission in the control unit 240 may be included in the transmitting unit 210, and a functional unit related to signal reception in the control unit 240 may be included in the receiving unit 220.

(Hardware Configuration)

Block diagrams (FIG. 10 and FIG. 11) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire and/or radio) and using these multiple devices. The functional block may be implemented by combining software with the above-described one device or the above-described plurality of devices Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

Figure 12:
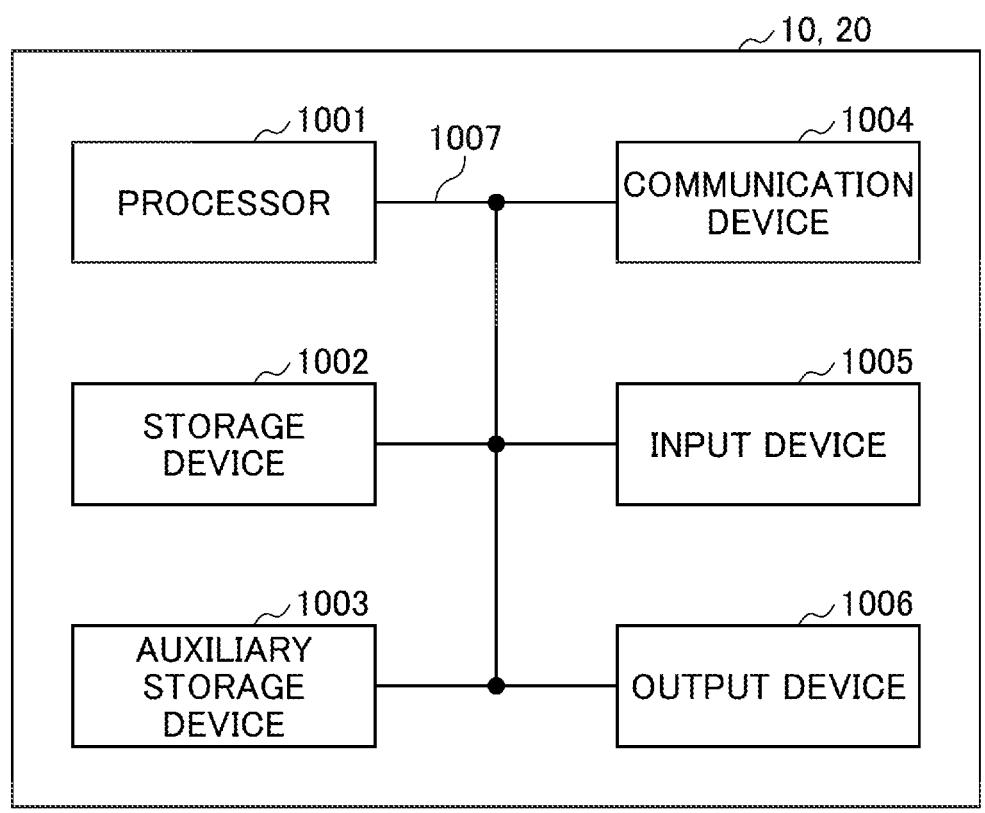
FIG. 12 is a diagram illustrating an example of a hardware configuration of the base station apparatus 10 or the user apparatus 20 according to an embodiment of the present invention.

For example, each of the base station apparatus 10 and the user apparatus 20 according to the embodiments of the present invention may function as a computer that performs processing of the radio communication method according to the present disclosure. FIG. 12 is a diagram illustrating an example of a hardware configuration of the base station apparatus 10 and the user apparatus 20 according to an embodiment of the present disclosure. The base station apparatus 10 and the user apparatus 20 may each be configured as a computer device including, physically, a processor 1001, a storage device 1002, an auxiliary storage device 1003, a communication device 1004, an input device 1005, an output device 1006, a bus 1007, and so forth.

In the following description, the term "device" can be replaced with a circuit, a device, a unit, or the like. The hardware configuration of the base station apparatus 10 and user apparatus 20 may be configured to include one or more of the devices depicted in the figure, or may be configured without some devices.

Each function of the base station apparatus 10 and the user apparatus 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and so forth. For example, the above-described control unit 140, control unit 240, or the like may be implemented by the processor 1001.

Additionally, the processor 1001 reads a program (program code), a software module, data, or the like, from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station apparatus 10 illustrated in FIG. 10 may be implemented by a control program that is stored in the storage device 1002 and that is operated by the processor 1001. Furthermore, for example, the control unit 240 of the user apparatus 20 illustrated in FIG. 11 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and so forth. The storage device 1002 may be referred to as a register, a cache, a main memory (main storage device), or the like. The storage device 1002 may store a program (program code), a software module, or the like, which can be executed for implementing the communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, and a magnetic strip. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, or a communication module. The communication device 1004 may be configured to include, for example, a high frequency switch, a duplexer, a filter, a frequency synthesizer, and the like to implement at least one of frequency division duplex (FDD: Frequency Division Duplex) and time division duplex (TDD: Time Division Duplex). For example, a transmitting/receiving antenna, an amplifier unit, a transceiver unit, a transmission line interface, and the like may be implemented by the communication device 1004. The transceiver unit may i.e implemented so that the transmitting unit and the receiving unit are physically or logically separated.

The input device 1005 is an input device (e.g., a keyboard, a mouse, a microphone, a switch, a button, or a sensor) that receives art external input. The output device 1006 is an output device (e.g., a display, speaker, or LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station apparatus 10 and the user apparatus 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

As described above, according to the embodiments of the present invention, there is provided a network node including a control unit that sets an information element in a field included in an inter-network node message for configuring communication with a user apparatus when the field is mandatory in the inter-network node message; and a transmitting unit that transmits, to another network node, the inter-network node message including the field in which the information element is set, wherein, when a predetermined condition is satisfied, the field is mandatory in the inter-network node message.

According to the above-described configuration, the network can be caused to appropriately function by transmitting information that is mandatory between network nodes as a mandatory field of an inter-network node message, regardless of a setting of the corresponding field between the user apparatus 20 and the base station apparatus 10. Furthermore, when the data type "SetupRelease" is not used, the base station apparatus 10 can cause the network to appropriately function by transmitting the inter network node message wile including, in the configuration, all the fields related to functions configured for the user apparatus 20 as mandatory fields. Namely, information that is mandatory between network nodes in a radio communication system can be transmitted and received.

The inter-network node message may be a handover request, and the predetermined condition may be determined regardless of whether the field is mandatory in a message between the user apparatus and the network node. According to this configuration, the network node can transmit the inter-network node message as a mandatory field, regardless of the setting of the corresponding field between the user apparatus 20 and the base station apparatus 10.

The field may be a timer used for discarding data at a Packet Data Convergence Protocol (PDCP) layer. According to this configuration, the network node can transmit the inter-network node message while setting the discardTime as a mandatory field.

The inter-network node message may be a request for addition, modification, or release at a secondary node, and the predetermined condition may be that the field does not include a data type specifying setup or release. According to this configuration, when the data type "SetupRelease" is not used, the base station apparatus 10 can apply a configuration in which all the fields related to functions configured for the user apparatus 20 are mandatory.

When the field includes the data type specifying setup or release, a delta configuration may be available for the field. According to this configuration, when the data type "SetupRelease" is used, the base station apparatus 10 can apply a delta configuration to a function configured for the user apparatus 20.

The inter-network node message may be a request for addition, modification, or release at a secondary node, and the predetermined condition may be that the field is other than a field for a configuration of the user apparatus, and the field need not maintain a value reported by a previously received message. According to this configuration, the base station apparatus 10 can apply a configuration while setting fields other than the fields related to the configuration of the user apparatus 20 as mandatory fields.

Supplemental Embodiments

While the embodiments of the present invention are described above, the disclosed invention is not limited to the embodiments, and those skilled in the art will appreciate various alterations, modifications, alternatives, substitutions, and so forth. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied to the items described in another item (as long as there is no contradiction). The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station apparatus 10 and the user apparatus 20 are described using functional block diagrams, but such devices may be implemented in hardware, software, or a combination thereof. Software operated by a processor included in the base station apparatus 10 in accordance with embodiments of the present invention and software operated by a processor included in the user apparatus 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by base station apparatus 10 may be performed by an upper node in some cases. It is apparent that in a network consisting of one or more network nodes having base station apparatus 10, various operations performed for communicating with the user apparatus 20 may be performed by at least one of the base station apparatus 10 and network nodes other than the base station apparatus 10 (e.g., MME or S-GW can be considered, however, the network node is not limited to these). The case is exemplified above in which there is one network node other than the base station apparatus 10. However, the network node other than the base station apparatus 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like, may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like, described in this disclosure may be represented using any of a variety of different techniques. For example, data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and so forth, may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (US: User Equipment)", or "terminal", may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user apparatuses 20 (e.g., may be referred to as Device-to-Device (D2D), or Vehicle-to-Everything (V2X)). In this case, a configuration may be such that the above-described function of the base station apparatus 10 is included in the user apparatus 20. The terms "up" and "down" may also be replaced with the terms corresponding to the inter-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (search, inquiry) (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expecting" "considering," and so forth.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," and so forth.

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, and the like.

A slot may be formed of, in a time domain, one or more symbols (Orthogonal Frequency Division Multiplexing (OFDM) symbols, Single Carrier Frequency Division Multiple Access (SC-FDMA) symbols, or the like). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for assigning radio resources (such as a frequency bandwidth and transmission power, that can be used in each user apparatus 20) in units of TTIs to each user apparatus 20. Note that the definition of the TTI is not limited to this.

The TTI may be a transmission time unit, such as a channel coded data packet (transport block), a code block, or a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time wait of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, and so forth. A TTI that is shorter than a normal TTI may be referred to as a shortened TTI, a short TTI, a partial TTI (partial TTI or fractional TTI), a shortened subframe, a short subframe, a mini-slot, a sub-slot, a slot, and so forth.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are merely illustrative. For example, the following configurations can be variously changed: the number of subframes included in the radio frame; the number of slots per subframe or radio frame; the number of mini-slots included in the slot; the number of symbols and RBs included in the slot or min-slot; the number of subcarriers included in the RB; the number of symbols, the symbol length, the cyclic prefix (CP: Cyclic Prefix) length, and the like within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

The aspects/embodiments described in this disclosure may be used alone, in combination, or switched with implementation. Notification of predetermined information (e.g., "X" notice) is not limited to a method that is explicitly performed, and may also be made implicitly (e.g. "no notice of the predetermined information").

Note that, in the present disclosure, AS-Config, CG-Config, or CG-ConfigInfo is an example of a communication configuration for the user apparatus. The discardTimer is an example of a timer used for discarding data. The HANDOCER REQUEST is an example of a handover request. The S-NODE ADDITION REQUEST is an example of a secondary node addition request. The data type "SetupRelease" is an example of a data type for which setup or release is specified.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes on and is not intended to restrict the present disclosure.

LIST OF REFERENCE SYMBOLS 10 base station apparatus
110 transmitting unit
120 receiving unit
130 configuration unit
140 control unit
20 user apparatus
210 transmitting unit
220 receiving unit
230 configuration unit
240 control unit
1001 processor
1002 storage device
1003 auxiliary storage device
1004 communication device
1005 input device
1006 output device

The invention claimed is:

1. A base station comprising:
a processor that sets a value in a second field when a CG-ConfigInfo message includes the second field other than a first field for a configuration of a terminal, the CG-ConfigInfo message being a request for configuring, modifying, or releasing a cell group of a secondary base station; and
a transmitter that transmits the message to another base station,
wherein, upon addition and change of the cell group of the secondary base station, the CG-ConfigInfo message mandatorily includes ue-CapabilityInfo, and the ue-CapabilityInfo includes Multi Radio Access Technology dual connectivity (MRDC) capability and New Radio (NR) capability.

2. The base station of claim 1, wherein the second field does not maintain a value reported by another CG-ConfigInfo message received prior to the message.

3. The base station of claim 1, wherein the CG-ConfigInfo message includes, as the first field, an information element including a bearer configuration in a master base station, an information element including a bearer configuration in the secondary base station, and an information element including a configuration of the cell group.

4. The base station of claim 3, wherein the information element including the bearer configuration in the master base station, the information element including the bearer configuration in the secondary base station, and the information element including the configuration of the cell group are used for a delta configuration.

5. A communication method by a base station, the method comprising:
setting a value in a second field when a CG-ConfigInfo message includes the second field other than a first field for a configuration of a terminal, the CG-ConfigInfo message being a request for configuring, modifying, or releasing a cell group of a secondary base station; and
transmitting the message to another base station,
wherein, upon addition and change of the cell group of the secondary base station, the CG-ConfigInfo message includes ue-CapabilityInfo, and the ue-CapabilityInfo includes Multi Radio Access Technology dual connectivity (MRDC) capability and New Radio (NR) capability.

6. A radio communication system comprising:
a terminal; and
a base station,
wherein the base station includes
a processor that sets a value in a second field when a CG-ConfigInfo message includes the second field other than a first field for a configuration of the terminal, the CG-ConfigInfo message being a request for configuring, modifying, or releasing a cell group of a secondary base station; and
a transmitter that transmits the message to another base station,
wherein, upon addition and change of the cell group of the secondary base station, the CG-ConfigInfo message mandatorily includes ue-CapabilityInfo, and the ue-CapabilityInfo includes Multi Radio Access Technology dual connectivity (MRDC) capability and New Radio (NR) capability.

\* \* \* \* \*